(12) United States Patent
Takahashi et al.

(10) Patent No.: US 10,481,263 B2
(45) Date of Patent: Nov. 19, 2019

(54) RANGE FINDING APPARATUS, MOVEABLE APPARATUS, ROBOT, THREE DIMENSIONAL MEASUREMENT APPARATUS, METHOD OF MEASURING THREE DIMENSIONAL INFORMATION, AND STORAGE MEDIUM

(71) Applicant: Ricoh Company, Ltd., Ohta-ku, Tokyo (JP)

(72) Inventors: Shu Takahashi, Kanagawa (JP); Yasuhiro Nihei, Kanagawa (JP); Masahiro Itoh, Kanagawa (JP); Takeshi Ogawa, Kanagawa (JP); Hiroaki Tanaka, Tokyo (JP); Yoichi Ichikawa, Kanagawa (JP); Koji Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 321 days.

(21) Appl. No.: 15/447,973

(22) Filed: Mar. 2, 2017

(65) Prior Publication Data

US 2017/0261611 A1    Sep. 14, 2017

(30) Foreign Application Priority Data

Mar. 10, 2016 (JP) .................................. 2016-046447
Jan. 25, 2017 (JP) .................................. 2017-010863

(51) Int. Cl.
*G01S 17/10*    (2006.01)
*G01S 17/36*    (2006.01)
(Continued)

(52) U.S. Cl.
CPC ............. *G01S 17/10* (2013.01); *G01S 7/4915* (2013.01); *G01S 17/36* (2013.01); *G01S 17/89* (2013.01)

(58) Field of Classification Search
CPC ........... G01S 17/08; G01S 7/497; G01S 7/483
See application file for complete search history.

(56) References Cited

U.S. PATENT DOCUMENTS 4,843,627 A * 6/1989 Stebbins ................. A63J 17/00
340/815.46
2009/0134396 A1   5/2009 Kawahito et al.
(Continued)

FOREIGN PATENT DOCUMENTS

JP    2009-103627    5/2009
JP    5110520    12/2012
(Continued)

*Primary Examiner* — Luke D Ratcliffe
(74) *Attorney, Agent, or Firm* — Xsensus LLP

(57) ABSTRACT

A range finding apparatus includes a light emission unit including a light source and a light source driver, a light detection unit, and circuitry. The light source driver supplies a plurality of drive pulses having different pulse width at different time periods. The light detection unit receives the light emitted from the light emission unit and then reflected from an object. The circuitry calculates a range to the object based on a time difference between one time point when a pulse light is emitted from the light source and another time point when light reflected from the object is received by the light detection unit. One of the drive pulses set with a smaller pulse width is set with a sine wave pattern, and another one of the drive pulses set with a greater pulse width is set with a rectangular wave pattern.

19 Claims, 12 Drawing Sheets

(51) Int. Cl.
    *G01S 17/89*     (2006.01)
    *G01S 7/491*     (2006.01)

(56) References Cited

U.S. PATENT DOCUMENTS

| | | | |
|---|---|---|---|
| 2015/0138529 A1* | 5/2015 | Singer | G01C 15/002 356/4.01 |
| 2015/0243017 A1 | 8/2015 | Fujimoto et al. | |
| 2016/0370460 A1 | 12/2016 | Takahashi et al. | |

FOREIGN PATENT DOCUMENTS

| | | |
|---|---|---|
| JP | 2013-538342 | 10/2013 |
| JP | 2015-501927 | 1/2015 |
| JP | 2015-068748 | 4/2015 |
| JP | 2015-172934 | 10/2015 |
| JP | 2016-008875 | 1/2016 |
| JP | 2017-009339 | 1/2017 |
| WO | WO 2007/026779 A1 | 3/2007 |
| WO | WO 2012/012607 A2 | 1/2012 |
| WO | WO2013/104717 A1 | 7/2013 |

* cited by examiner

RANGE FINDING APPARATUS, MOVEABLE APPARATUS, ROBOT, THREE DIMENSIONAL MEASUREMENT APPARATUS, METHOD OF MEASURING THREE DIMENSIONAL INFORMATION, AND STORAGE MEDIUM

CROSS-REFERENCE TO RELATED APPLICATION

This application claims priority pursuant to 35 U.S.C. § 119(a) to Japanese Patent Application Nos. 2016-046447, filed on Mar. 10, 2016, and 2017-010863, filed on Jan. 25, 2017 in the Japan Patent Office, the disclosure of which are incorporated by reference herein in their entirety.

BACKGROUND

Technical Field

This disclosure relates to a range finding apparatus, a moveable apparatus, a robot, and a method of measuring three dimensional information.

Background Art

Technologies to find a range or distance to an object have been developed. For example, sensors to find a range to objects are available for various field applications. Some sensors use a time of flight (TOF) computing to find a range or distance to an object, in which the range can be detected based on a time difference between one time point when a pulse light is emitted from a light source and another time point when light reflected from object is received by a light receiving element.

However, conventional range finding technologies may not perform both of the higher-resolution range finding, which improves the measurement precision of distance, and the broader range finding, which detects broader distance range such as near distance to far distance, with a higher level.

SUMMARY

As one aspect of the present disclosure, a range finding apparatus is devised. The range finding apparatus includes a light emission unit including a light source and a light source driver, the light source driver to supply a plurality of drive pulses including a first drive pulse having a first pulse width to the light source at a first time period, and a second drive pulse having a second pulse width to the light source at a second time period, the first pulse width and the second pulse width being different with each other, and the first time period and the second time period being different with each other, a light detection unit to receive the light emitted from the light emission unit and then reflected from an object, and circuitry to calculate a range to the object based on a time difference between one time point when a pulse light is emitted from the light source and another time point when light reflected from the object is received by the light detection unit. When the first pulse width is set smaller than the second pulse width, the first drive pulse is set with a sine wave pattern and the second drive pulse is set with a rectangular wave pattern, and when the second pulse width is set smaller than the first pulse width, the first drive pulse is set with a rectangular wave pattern and the second drive pulse is set with a sine wave pattern.

As another one aspect of the present disclosure, a method of measuring three dimensional information of an object is devised. The method of measuring three dimensional information of the object includes supplying a first drive pulse having a first pulse width to a light source to emit a first light from the light source, receiving the first light, emitted from the light source and reflected from an object, by a light detection unit, supplying a second drive pulse having a second pulse width, different from the first pulse width of the first drive pulse, to the light source to emit a second light from the light source, receiving the second light, emitted from the light source and reflected from the object by the light detection unit, and calculating three dimensional information of the object based on a reception result of the first light by the light detection unit and a reception result of the second light by the light detection unit. When the first pulse width is set smaller than the second pulse width, the first drive pulse is set with a sine wave pattern and the second drive pulse is set with a rectangular wave pattern, and when the second pulse width is set smaller than the first pulse width, the first drive pulse is set with a rectangular wave pattern and the second drive pulse is set with a sine wave pattern.

As another one aspect of the present disclosure, a non-transitory storage medium storing a program that, when executed by a computer, causes the computer to execute a method of measuring three dimensional information of an object is devised. The method of measuring three dimensional information of the object includes supplying a first drive pulse having a first pulse width to a light source to emit a first light from the light source, receiving the first light, emitted from the light source and reflected from an object, by a light detection unit, supplying a second drive pulse having a second pulse width, different from the first pulse width of the first drive pulse, to the light source to emit a second light from the light source, receiving the second light, emitted from the light source and reflected from the object by the light detection unit, and calculating three dimensional information of the object based on a reception result of the first light by the light detection unit and a reception result of the second light by the light detection unit. When the first pulse width is set smaller than the second pulse width, the first drive pulse is set with a sine wave pattern and the second drive pulse is set with a rectangular wave pattern, and when the second pulse width is set smaller than the first pulse width, the first drive pulse is set with a rectangular wave pattern and the second drive pulse is set with a sine wave pattern.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
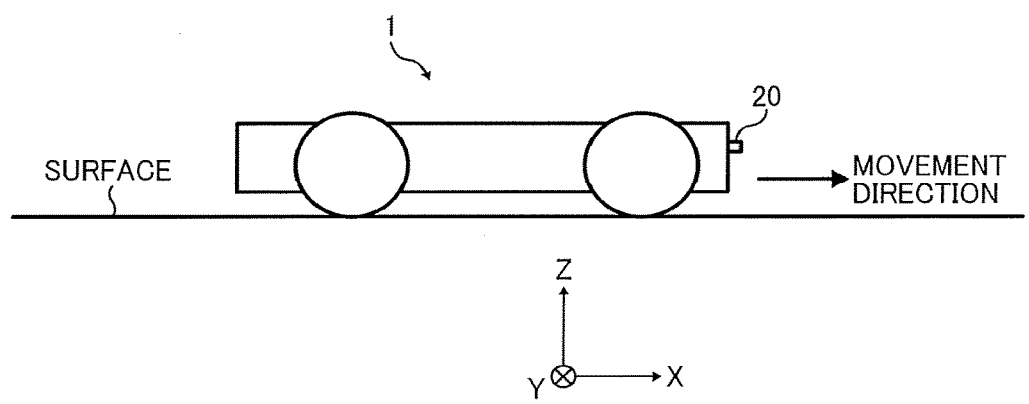
FIG. 1 is a schematic view of a vehicle mounted with a range sensor according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present disclosure.

In addition, it should be noted that the terminology used herein is for the purpose of describing particular embodiments only and is not intended to be limiting of the present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments of the present disclosure are described hereinafter.

A description is given of an embodiment of the present invention with reference to drawings. FIG. 1 is a schematic view of a vehicle 1 mounted with a range sensor 20 such as a time-of-flight (TOF) sensor used as a range finding apparatus according to an embodiment of the present invention. The vehicle 1 is, for example, an unmanned transporter for transporting goods and others to a destination. Further, the vehicle 1 can be a manned vehicle depending on application fields. In this description, the three dimensional rectangular coordinate system "X, Y, Z" is defined by setting a direction perpendicular to a surface as Z-axis direction, and setting the forward direction of the vehicle 1 as +X direction. The vehicle 1 mounted with the range sensor 20 can be used in various fields such a factory, an inventory house or the like, but not limited to these.

The range sensor 20 such as the TOF sensor is, for example, disposed at the front end of the vehicle 1 to detect three dimensional information such as object information in the +X direction of the vehicle 1. In this description, an area or region detectable by the range sensor 20 is referred to a detection range.

Figure 2:
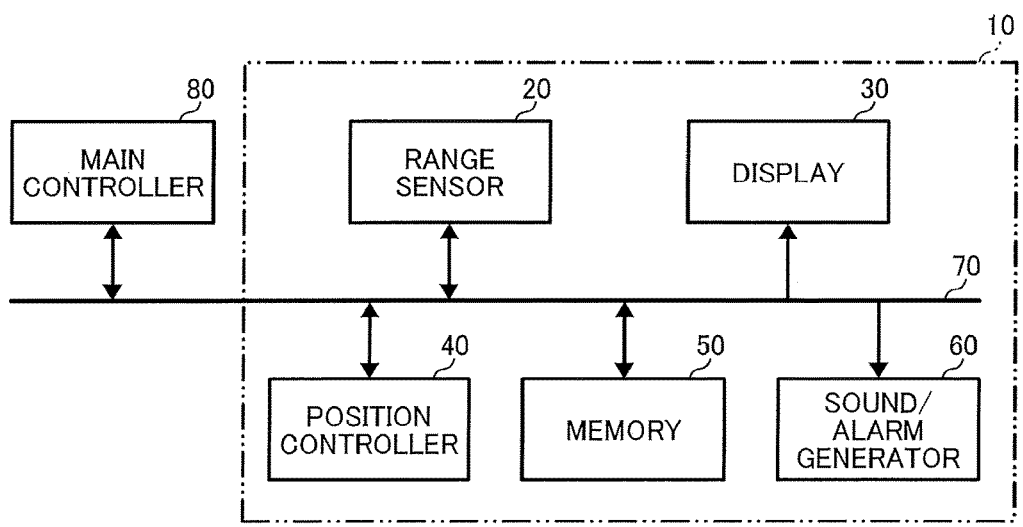
FIG. 2 is a block diagram of a monitoring apparatus for the vehicle of FIG. 1.

As illustrated in FIG. 2, the vehicle 1 includes, for example, a display 30, a position controller (monitoring controller) 40, a memory 50, and a sound/alarm generator 60, which are electrically coupled to or connected with each other via a bus 70 for communicating data.

As illustrated in FIG. 2, a travel management apparatus 10 can be configured, for example, with the range sensor 20, the display 30, the position controller (monitoring controller) 40, the memory 50 and the sound/alarm generator 60, which means the travel management apparatus 10 can be mounted to the vehicle 1. Further, the travel management apparatus 10 can be electrically connected with or coupled to a main controller 80 of the vehicle 1 via wire and/or wirelessly. The travel management apparatus 10 can be devised as a sensor apparatus or a sensor system. When the travel management apparatus 10 is devised as the sensor apparatus, the sensor apparatus including the range sensor 20, the display 30, the position controller (monitoring controller) 40, the memory 50 and the sound/alarm generator 60 can be disposed on the vehicle 1. When the travel management apparatus 10 is devised as the sensor system, the entire or any one of the display 30, the position controller (monitoring controller) 40, the memory 50 and the sound/alarm generator 60 configuring the sensor system may not be disposed on the vehicle 1 while the range sensor 20 is disposed on the vehicle 1. As far as the information acquired by the range sensor 20 can be communicated with other units, the entire or any one of the display 30, the position controller (monitoring controller) 40, the memory 50 and the sound/alarm generator 60 configuring the sensor system may not be required to be disposed on the vehicle 1 but can be disposed separately from the vehicle 1.

The main controller 80 is used to control the vehicle 1 entirely, and the main controller 80 can be configured, for example, with a central processing unit (CPU) 110, a read only memory (ROM) 120 and a random access memory (RAM) 130 as illustrated in FIG. 2B.

Figure 20:
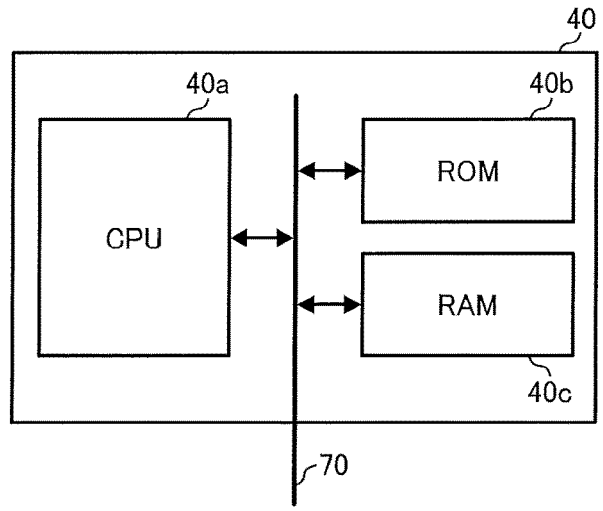
FIG. 20 illustrates an example hardware block diagram of a position controller.

The position controller (monitoring controller) 40 controls a three dimensional information acquisition unit 203 based on an instruction from the main controller 80, calculates a position of the vehicle 1 based on information acquired from the three dimensional information acquisition unit 203, and transmits the calculated position information of the vehicle 1 to the main controller 80. The position controller (monitoring controller) 40 can be configured, for example, with a central processing unit (CPU) 40a, a read only memory (ROM) 40b, and a random access memory (RAM) 40c as illustrated in FIG. 20. As to the position controller (monitoring controller) 40, the ROM 40b stores programs used for executing the above described operations by using the position controller (monitoring controller) 40. The CPU 40a loads the programs to the RAM 130 when executing the above described operations.

Figure 3:
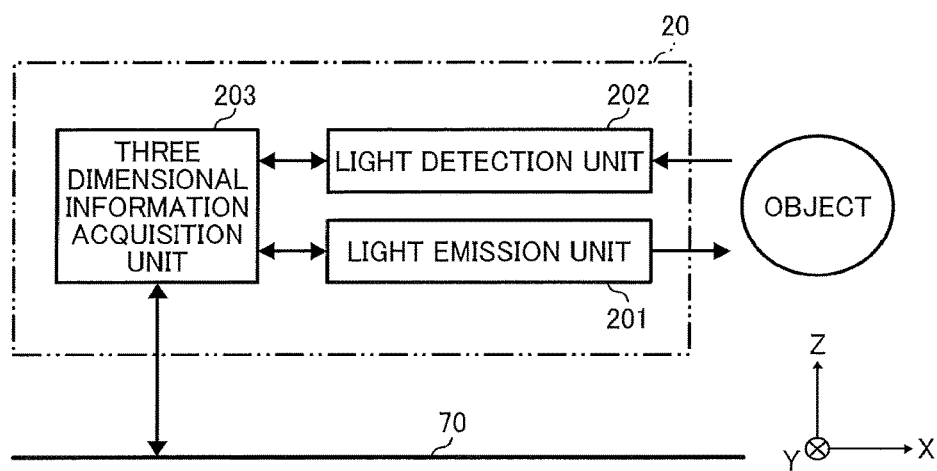
FIG. 3 is a block diagram of the range sensor of FIG. 1.

As illustrated in FIG. 3, the range sensor 20 includes, for example, a light emission unit 201, a light detection unit 202, and a three dimensional information acquisition unit 203, which are encased in a casing. The casing has a window, which may be attached with a translucent member such as glass, with which light emitted from the light emission unit 201 exits outside the range sensor 20 through the window, and light reflected from an object enters the light detection unit 202 through the window. The range sensor 20 can use various light for detecting the range to an object. For example, the range sensor 20 can use infrared ray, visible range ray, and others depending on application fields.

Figure 18:
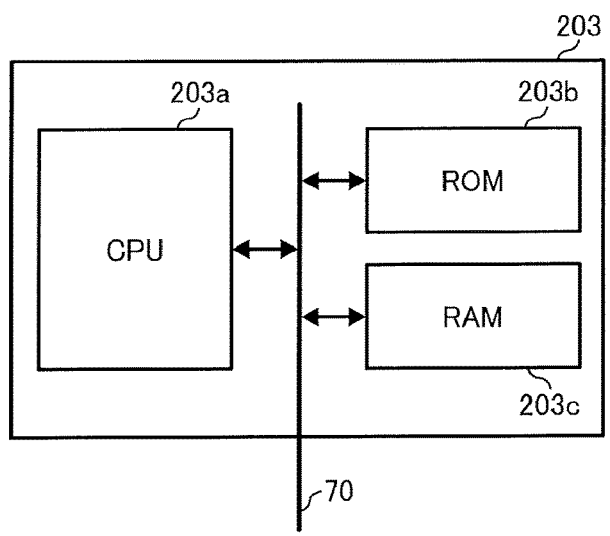
FIG. 18 illustrates an example hardware block diagram of a three dimensional information acquisition unit.

The three dimensional information acquisition unit 203 calculates three dimensional information such as distance or range information based on a control of the light emission unit 201 and the light detection unit 202, and signals from the light detection unit 202. The three dimensional information acquisition unit 203 is used as a control unit to control the range sensor 20. The three dimensional information acquisition unit 203 can be configured, for example, with a central processing unit (CPU) 230a, a read only memory (ROM) 230b and a random access memory (RAM) 203c as illustrated in FIG. 18. As to the three dimensional information acquisition unit 203, the ROM 203b stores programs used for executing the above described operations by the three dimensional information acquisition unit 203. The CPU 230a loads the programs to the RAM 203c when executing the above described operations.

Figure 4:
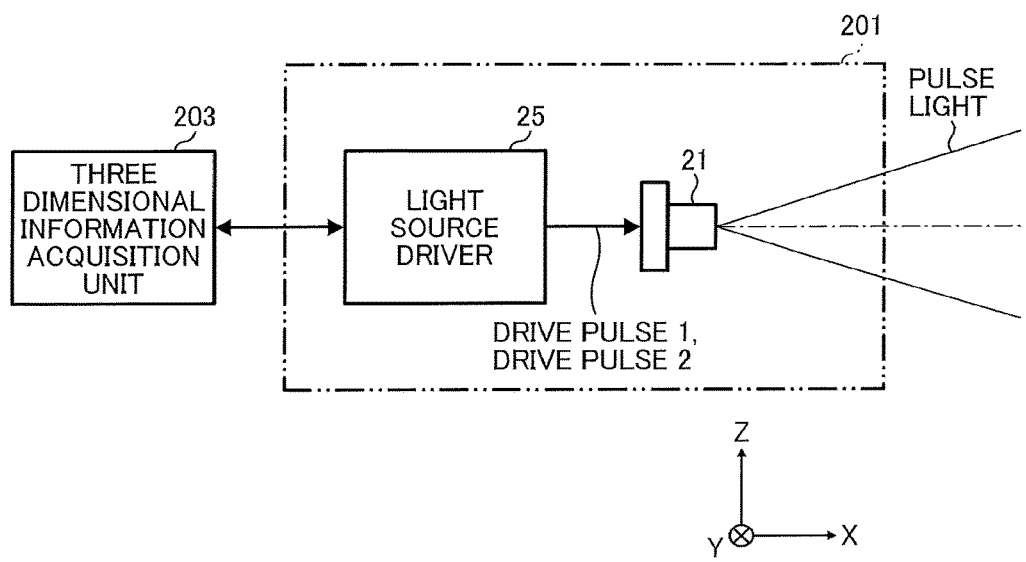
FIG. 4 is a block diagram of a light emission unit of the range sensor of FIG. 1.

As illustrated in FIG. 3, the light emission unit 201 can be disposed at the −Z side with respect to the light detection unit 202. As illustrated in FIG. 4, the light emission unit 201 includes, for example, a light source 21, and a light source driver 25.

The light source 21 can be turned ON and OFF under the control of the light source driver 25. In this description, the light source 21 employs a light emission diode (LED) but not limited thereto. For example, the light source 21 can employ a semiconductor laser such as edge emitting laser and surface-emitting laser, and other light sources. As illustrated in FIG. 4, the light source 21 can be disposed at a position to emit the light to the +X direction. Hereinafter, a signal generated by the light source driver 25 and then used for driving the light source 21 is referred to a "light source drive signal."

Figure 5:
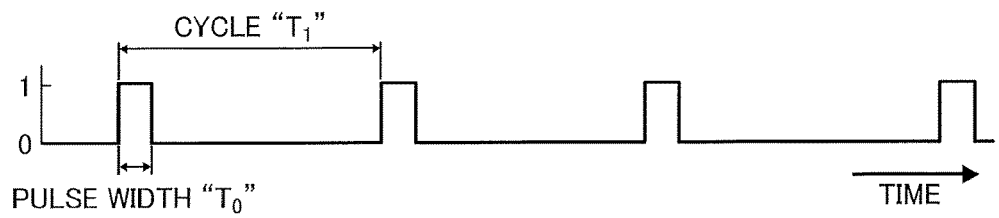
FIG. 5 is an example of a pulse control signal.
Figure 6:
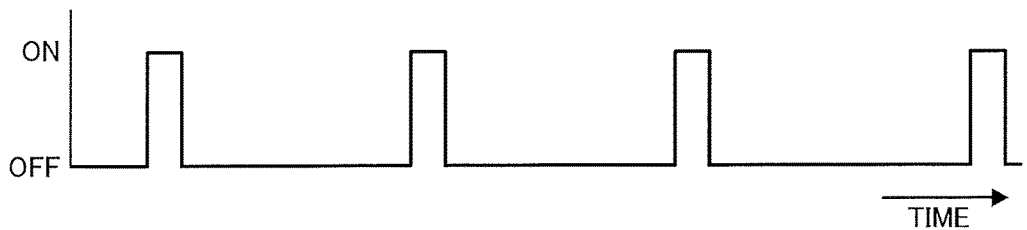
FIG. 6 is an example of a light source drive signal.

The light source driver 25 generates the light source drive signal (see FIG. 6) based on the pulse control signal (see FIG. 5) received from the three dimensional information acquisition unit 203, and the light source driver 25 transmits the light source drive signal to the light source 21 and the three dimensional information acquisition unit 203. The light source drive signal to be output to the light source 21 is generated by amplifying the pulse control signal received from the three dimensional information acquisition unit 203 so that the light source 21 can emit the light when the light source 21 receives the light source drive signal. Therefore, the light source driver 2 can be used as an amplifier. Hereinafter, the light source drive signal may be referred to as a "drive pulse."

Then, the light source 21 emits a pulse light having a pulse width that is instructed from the three dimensional information acquisition unit 203. The light-emission duty of the pulse light emitted from the light source 21 is set, for example, 50% or less by the three dimensional information acquisition unit 203. Hereinafter, the pulse light emitted from the light source 21 may be referred to "emission light wave," "emission light pulse (pulse light)," or "detection-use light."

When the vehicle 1 is being moved, the main controller 80 of the vehicle 1 transmits a request for starting a position control of to position controller (monitoring controller) 40. Then, when the vehicle 1 reaches a target position, the main controller 80 of the vehicle 1 transmits a request for ending the position control to the position controller (monitoring controller) 40.

When the position controller (monitoring controller) 40 receives the request for starting acquisition of the object information or the request for ending acquisition of the object information, the position controller (monitoring controller) 40 transmits the request for starting acquisition of the object information or the request for ending acquisition of the object information to the three dimensional information acquisition unit 203.

A part of the light, emitted from the range sensor 20, is reflected on the object, and then returns to the range sensor 20. Hereinafter, the light reflected from the object and then received by the range sensor 20 may be referred to as the reflection light reflected from the object, or simply referred to as the reflection light.

Figure 7:
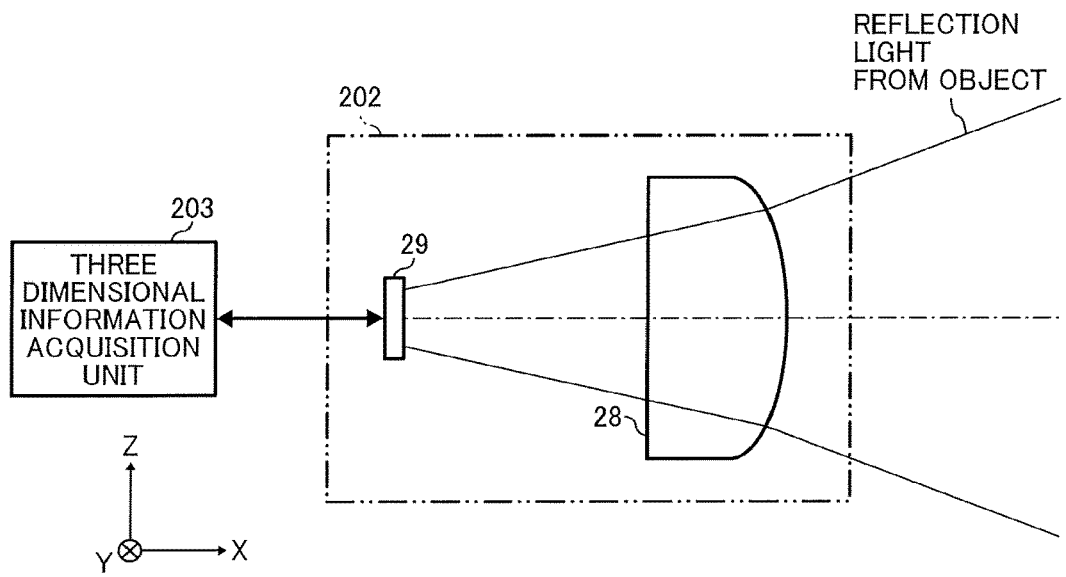
FIG. 7 is a block diagram of a light detection unit of the range sensor of FIG. 1.

The light detection unit 202 detects the reflection light reflected from the object. The light detection unit 202 employs, for example, a TOF camera, which is an example of sensors to find the range to objects. As illustrated in FIG. 7, the light detection unit 202 includes, for example, an image forming unit 28, and an image sensor 29.

The image forming unit 28 is disposed at a position on the light path of the reflection light reflecting from the object to focus the reflection light on the image sensor 29. In this example case, the image forming unit 28 is configured with one lens, but the image forming unit 28 can be configured with two lenses and three or more lenses, or the image forming unit 28 can employ a mirror unit.

The image sensor 29 receives the reflection light reflected from the object via the image forming unit 28. The image sensor 29 includes a light reception element such as complementary metal oxide semiconductor (CMOS) image sensor. A signal output from the image sensor 29 (e.g., analog signal) is converted to a digital signal by an analog digital converter (ADC), and then the digital signal is transmitted to the three dimensional information acquisition unit 203. The image sensor 29 employs, for example, an area image sensor configured by arranging a plurality of light reception elements two dimensionally for each of pixels. Hereinafter, the reflection light reflected from the object and received by the image sensor 29 may be also referred to as "reception light wave" or "reception light pulse."

Figure 19:
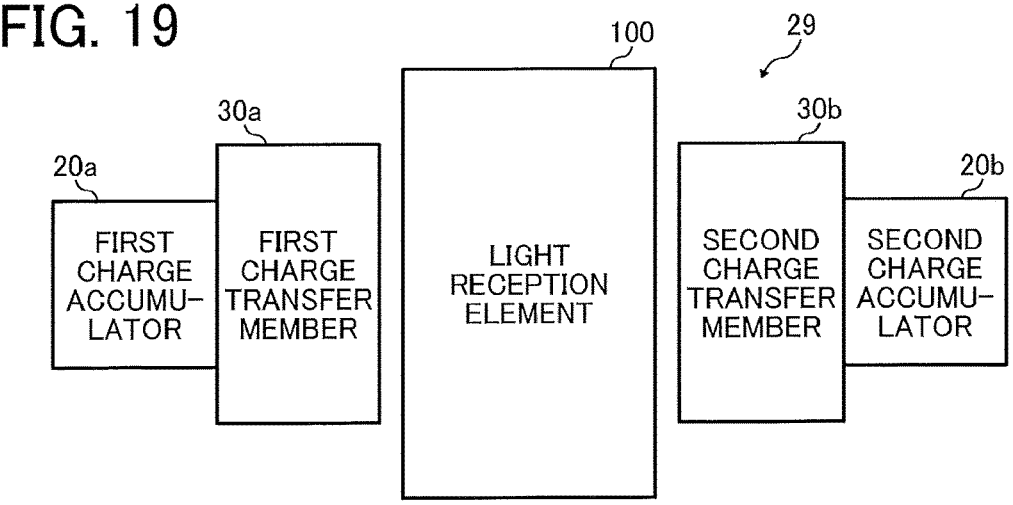
FIG. 19 illustrates an example hardware block diagram of an image sensor including one light reception element, and two charge accumulators.

As to the image sensor 29, each one of the light reception elements (e.g., photo diode, photo transistor) includes two charge accumulators s to be described later in this description (FIG. 19). When a signal TX1 is at a high level, charges generated by a light-to-electricity conversion process at the light reception element is accumulated in one of the two charge accumulators. When a signal TX2 is at a high level, the charges generated by the light-to-electricity conversion process at the light reception element is accumulated in another one of the two charge accumulators. Further, as to the image sensor 29, when a signal TXD is at a high level, the charges are not accumulated, and when a reset signal becomes a high level, the charges accumulated in the two charge accumulators is reset to zero.

The three dimensional information acquisition unit 203 includes, for example, a modulation frequency controller and a range image generator. The modulation frequency controller controls a frequency of a drive pulse applied to the light source 21, which is used as a modulation frequency. The range image generator calculates a range or distance to an object based on a time difference between one time point when a pulse light is emitted from of the light source 21 and another time point when light reflected from object is received by the image sensor 29 to generate three dimensional information of the object as a range image.

Figure 8:
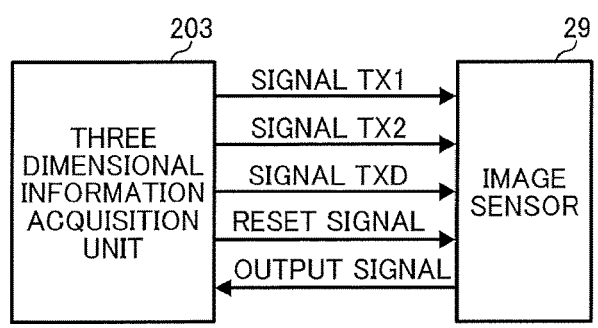
FIG. 8 illustrates signals communicable between a three dimensional information acquisition unit and an image sensor.

As indicated in FIG. 8, the three dimensional information acquisition unit 203 outputs, for example, the signal TX1, the signal TX2, the signal TXD, and the reset signal to the image sensor 29.

Figure 9:
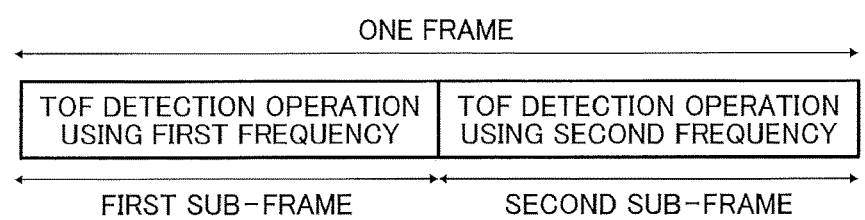
FIG. 9 schematically illustrates an example configuration of one frame used for the range sensor.

FIG. 9 schematically illustrates an example configuration of one frame used for the range sensor 20. The range sensor 20 performs two or more TOF detection operations (detection operation using TOF computing method) using different modulation frequencies, in which the range sensor 20 acquires the range information (or distance information) having higher range resolution based on the TOF detection operation at a higher frequency range, determines aliasing components included in the TOF detection information acquired at the higher frequency range, and then performs the de-aliasing in the TOF detection operation at a lower frequency range.

In this disclosure, one frame includes, for example, two sub-frames such as a first sub-frame and a second sub-frame, in which the first sub-frame and the second sub-frame use different modulation frequencies. Specifically, a modulation frequency of the first sub-frame (i.e., a frequency of a first drive pulse) is set as a first frequency f1, and a modulation frequency of the second sub-frame (i.e., a frequency of a second drive pulse) is set as a second frequency f2.

For example, the three dimensional information acquisition unit 203 performs the TOF detection operation using the first frequency f1, and stores the phase information for the TOF detection operation using the first frequency f1 in a memory of the range image generator. Then, the modulation frequency controller switches the first frequency f1 to the second frequency f2, and the three dimensional information acquisition unit 203 performs the TOF detection operation using the second frequency f2. In this disclosure, the first frequency f1 is set greater than the second frequency f2 (i.e., first frequency f1>second frequency f2). Further, the three dimensional information acquisition unit 203 can perform the TOF detection operation using the second frequency f2 at first, and then the TOF detection operation using the first frequency f1.

A description is given of two TOF methods known as the sine wave modulation method and the rectangular wave modulation method.

As to the sine wave modulation method, the reception light wave is divided into three or more signals temporally, and then detected. By using the detected each of signals, the delay time Td of the input timing of the reception light wave with respect to the output timing of the emission light wave is acquired by calculating a difference of phase angles.

Figure 10:
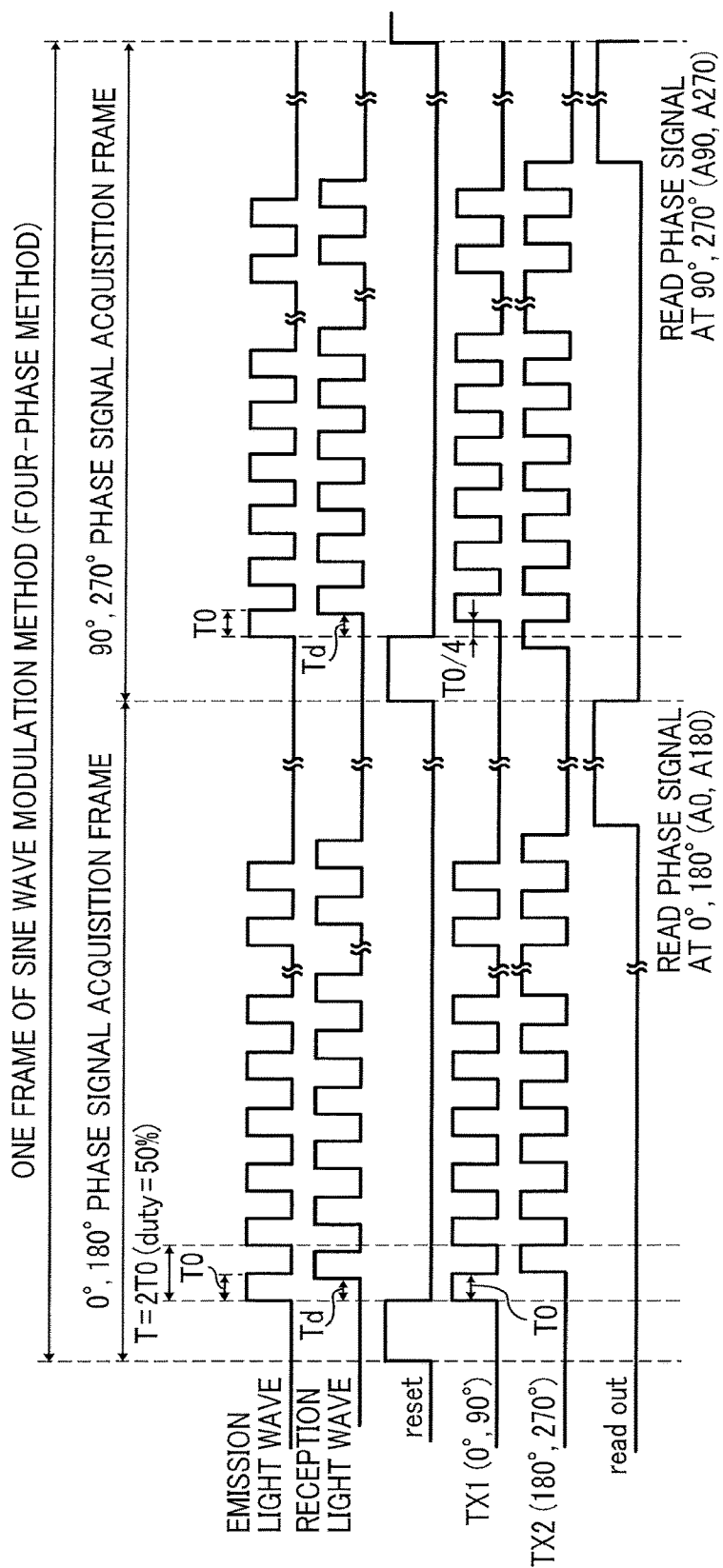
FIG. 10 is a timing chart of one frame used for a sine wave modulation method using four phases.

A description is given of a method of calculating a difference of phase angles by using the sine wave modulation method of four-phase method with reference to FIG. 10. When the one frame having a configuration indicated in FIG. 10 is used, the reception light pulse is divided, for example, into four phases of 0°, 90°, 180°, and 270° to acquire signals of A0, A90, A180, and A270, and then the difference of phase angles Φ is calculated by using the equation (1).

$$\Phi = \arctan\{(A90-A270)/(A0-A180)\} \quad (1)$$

Then, the delay time Td can be calculated by using the equation (2) based on the difference of phase angles Φ calculated by using the equation (1). In the equation (2), T=2T0, and T0 is a pulse width of the drive pulse.

$$Td = \Phi/2\pi \times T \quad (2)$$

When calculating the difference of phase angles, the ideal waveform of the emission light wave to enhance the range finding capability is the sine waveform. Therefore, as to the sine wave modulation method, the light source is driven by a drive pulse using the sine wave modulation signal.

As to the rectangular wave modulation method, the reception light wave is divided into two or more signals temporally, and then detected. By using the detected each of signals, the delay time Td' of the input timing of the reception light wave with respect to the output timing of emission light wave is acquired.

Figure 11:
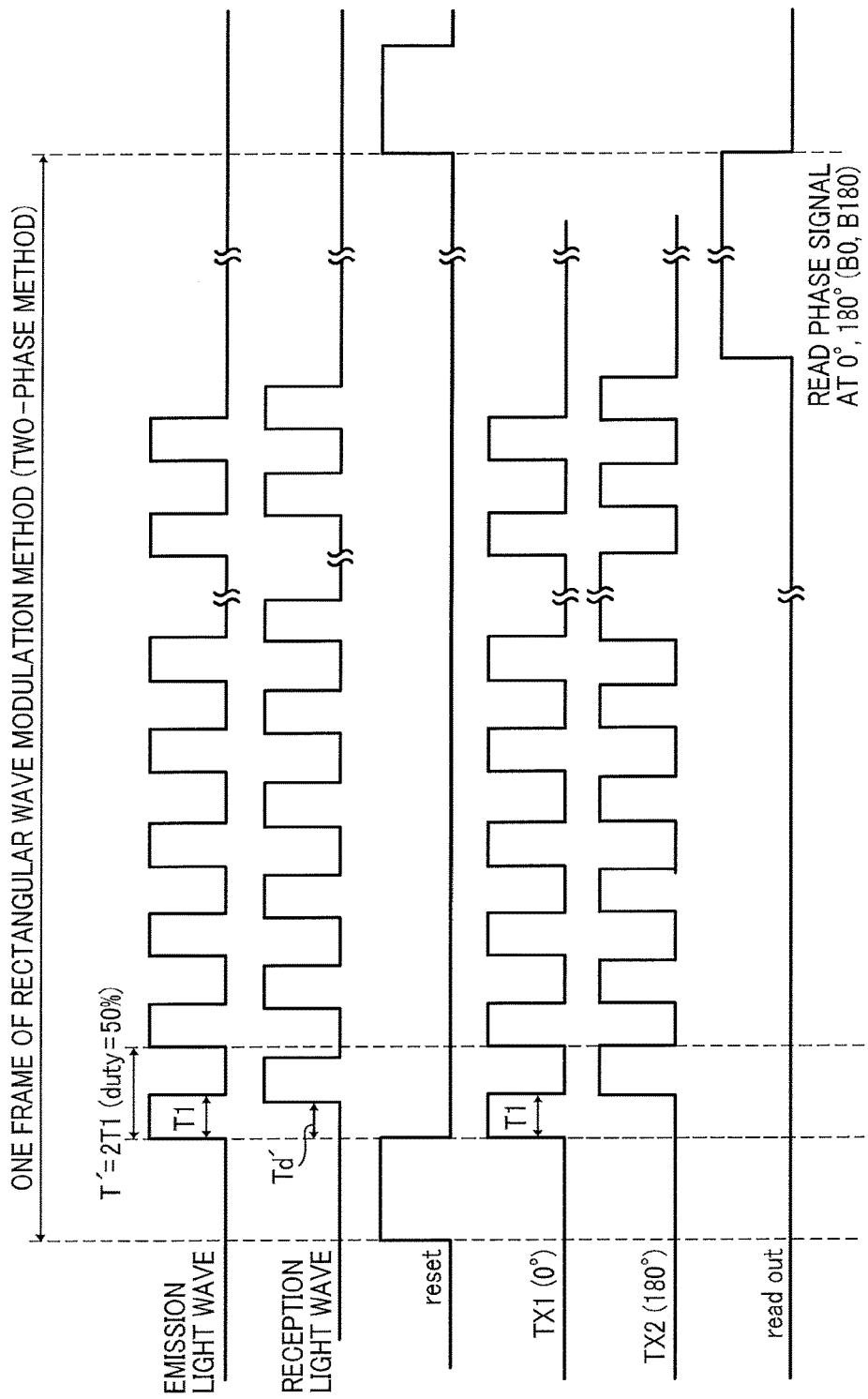
FIG. 11 is a timing chart of one frame used for a rectangular wave modulation method using two phases.

A description is given of the rectangular wave modulation method for two-phase method with reference to FIG. 11. When the one frame having a configuration indicated in FIG. 11 is used, the reception light wave is divided into, for example, two phases of 0° and 180° to acquire signals B0 and B180, and then the delay time Td' can be calculated by using the equation (3), in which T1 is a pulse width of the drive pulse.

$$Td' = \{B180/(B0+B180)\} \times T1 \quad (3)$$

When calculating the difference of phase angles, the ideal waveform of the emission light wave to enhance the range finding capability is the rectangular waveform. Therefore, as to the rectangular wave modulation method, the light source is driven by a drive pulse using the rectangular wave modulation signal.

As to a conventional method, the TOF detection operation using the sine wave modulation method is performed for both of the first frequency f1 and the second frequency f2, and the de-aliasing (i.e., removing aliasing components) is performed by using the plus or minus sign of "I" value defined as I=(A0−A180) and the plus or minus sign of "Q" value defined as Q=(A90−A270).

Figure 12:
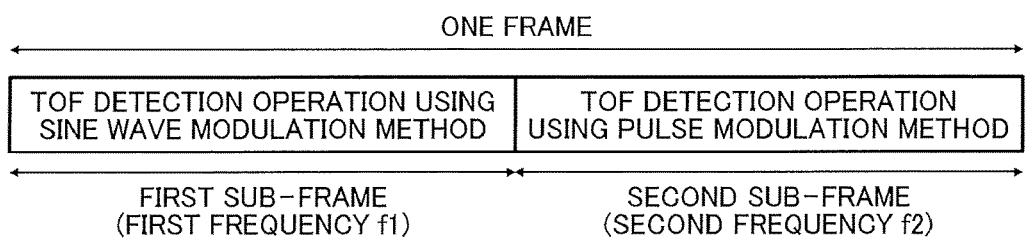
FIG. 12 schematically illustrates a configuration of one frame used for the range sensor.

FIG. 12 schematically illustrates a configuration of one frame used for the range sensor 20 of an embodiment.

The range sensor 20 performs the TOF detection operation using the sine wave modulation method for the first frequency f1 while the range sensor 20 performs the TOF detection operation using the rectangular wave modulation method for the second frequency f2, in which the second frequency f2 is set smaller than the first frequency f1. A description is given of this reason as below.

The light source can employ various devices. For example, the light source employs a laser diode (LD). When the laser diode (LD) is used as the light source, and a pulse width of modulation signal (drive pulse) is, for example, less than 10 ns (e.g., modulation frequency is at a higher frequency range), and the effect of waveform distortion during the rise time and the fall time becomes greater, and the emission light pulse (pulse light) has a waveform similar to the sine waveform.

By contrast, if the pulse width of modulation signal (drive pulse) is, for example, 10 ns or more (e.g., modulation frequency is at a lower frequency range), the emission light pulse (pulse light) has a waveform similar to rectangular waveform.

The higher resolution range finding can be performed effectively by performing the TOF detection operation using the modulation frequency at the higher frequency range (e.g., TOF detection operation using a drive pulse having a relatively shorter pulse width). Since the emission light pulse (pulse light) having the modulation frequency at the higher frequency range has a waveform similar to the sine waveform, the TOF detection operation using the sine wave modulation method can be applied preferably.

By contrast, when the TOF detection operation is performed using the modulation frequency at the lower frequency range for the de-aliasing (e.g., TOF detection operation using a drive pulse having a relatively longer pulse width), the emission light pulse (pulse light) having the modulation frequency at the lower frequency range has a waveform similar to the rectangular waveform. Therefore, the rectangular wave modulation method can be applied preferably.

Therefore, by using the frame configuration of FIG. 12, the detection precision can be enhanced for both of the TOF detection operation using the modulation frequency at the higher frequency range, and the TOF detection operation using the modulation frequency at the lower frequency range.

A description is given of another example of another configuration of one frame used for the range sensor 20 of an embodiment.

Typically, as above described, the image sensor 29 used for the TOF detection operation uses one light reception element for one pixel, in which the one light reception element has two charge accumulators to allocate charges into the two charge accumulators. FIG. 19 illustrates an example hardware block diagram of the image sensor 29. As indicated in FIG. 19, the image sensor 29 includes, for example, a light reception element 100, a first charge accumulator 20a and a second charge accumulator 20b, and a first charge transfer member 30a, and a second charge transfer member 30b. The first charge accumulator 20a is disposed at one side of the light reception element 100 via the first charge accumulator 20a while the second charge accumulator 20b is disposed at another side of the light reception element 100 via the second charge transfer member 30b. The light reception element 100 converts the received light to charge signals. Then, a part of the charge signals is transferred from the light reception element 100 to the first charge accumulator 20a via the first charge transfer member 30a, and a remaining part of the charge signals is transferred from the light reception element 100 to the second charge accumulator 20b via the second charge transfer member 30b.

Figure 13:
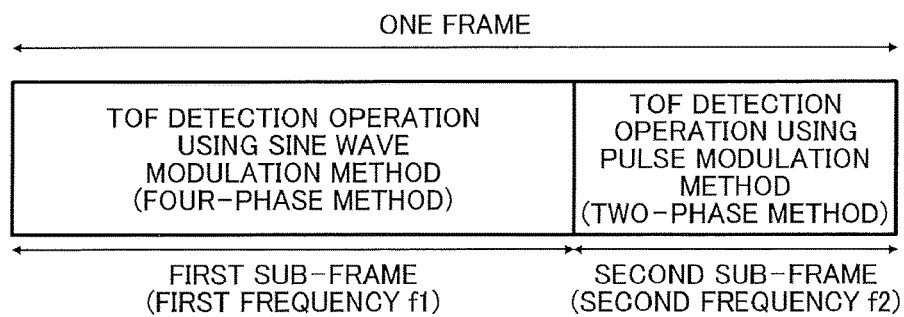
FIG. 13 schematically illustrates a configuration of one frame used for the range sensor.

In this case, by using the configuration of one frame of FIG. 13, the time required for performing the de-aliasing using the TOF detection operation using the second frequency f2 can be reduced. Specifically, the charges of pixel can be allocated to two charge accumulators, and the number of phases required for the TOF detection operation using the second frequency f2 is also two. Therefore, the exposure time for acquiring signals of 0° and 180° in one sub-frame period can be set one time. A description is given of the effect of the sub-frame of FIG. 13 with reference to FIG. 14 by comparing with the configuration of one frame used for conventional art.

Figure 14:
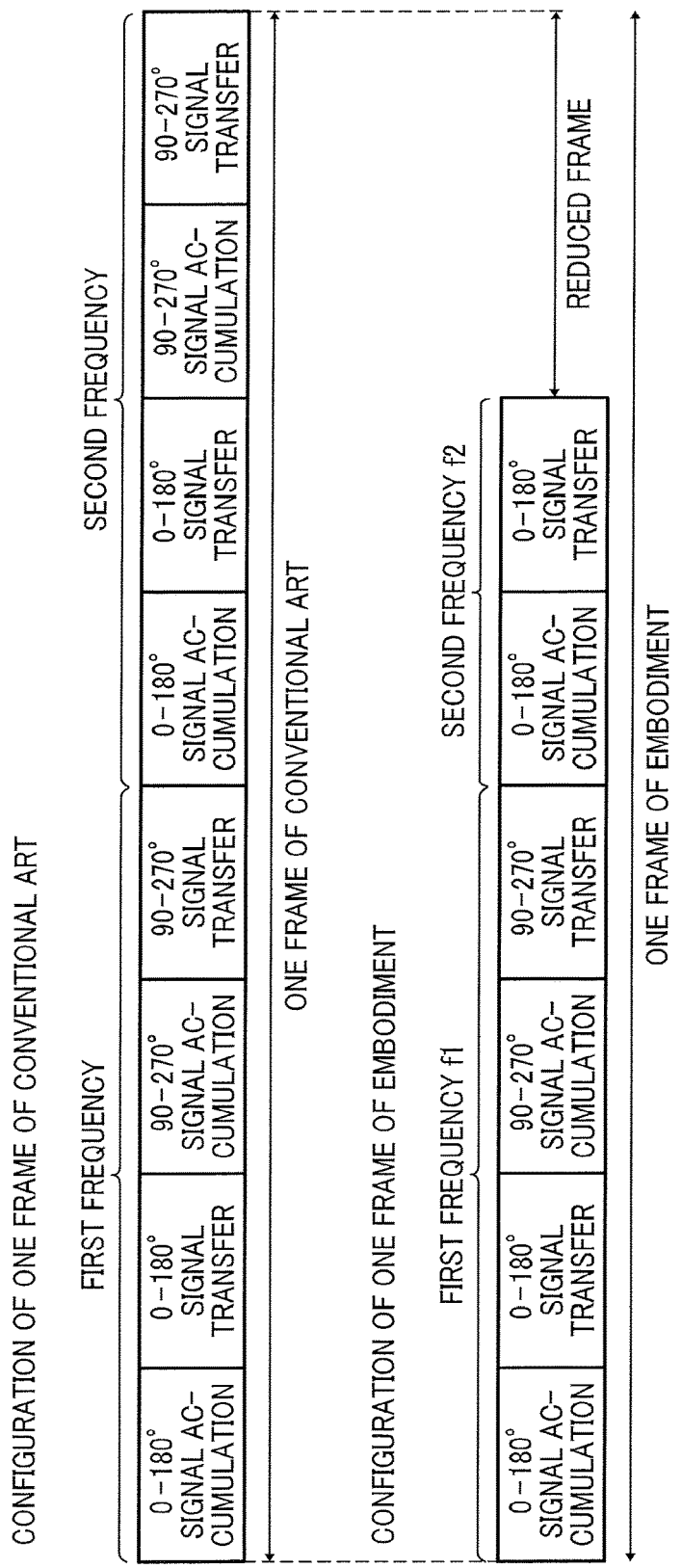
FIG. 14 schematically illustrates one frame of conventional art, and one frame of an embodiment

Compared to conventional art, the frame length of one frame can be reduced for an embodiment as indicated in FIG. 14. This reduced time period by reducing the frame length of one frame can be used to enhance the frame rate and to enhance the signal-to-noise (S/N) ratio by extending the signal accumulation time, with which the range finding performance of the range sensor 20 can be enhanced.

Figure 15:
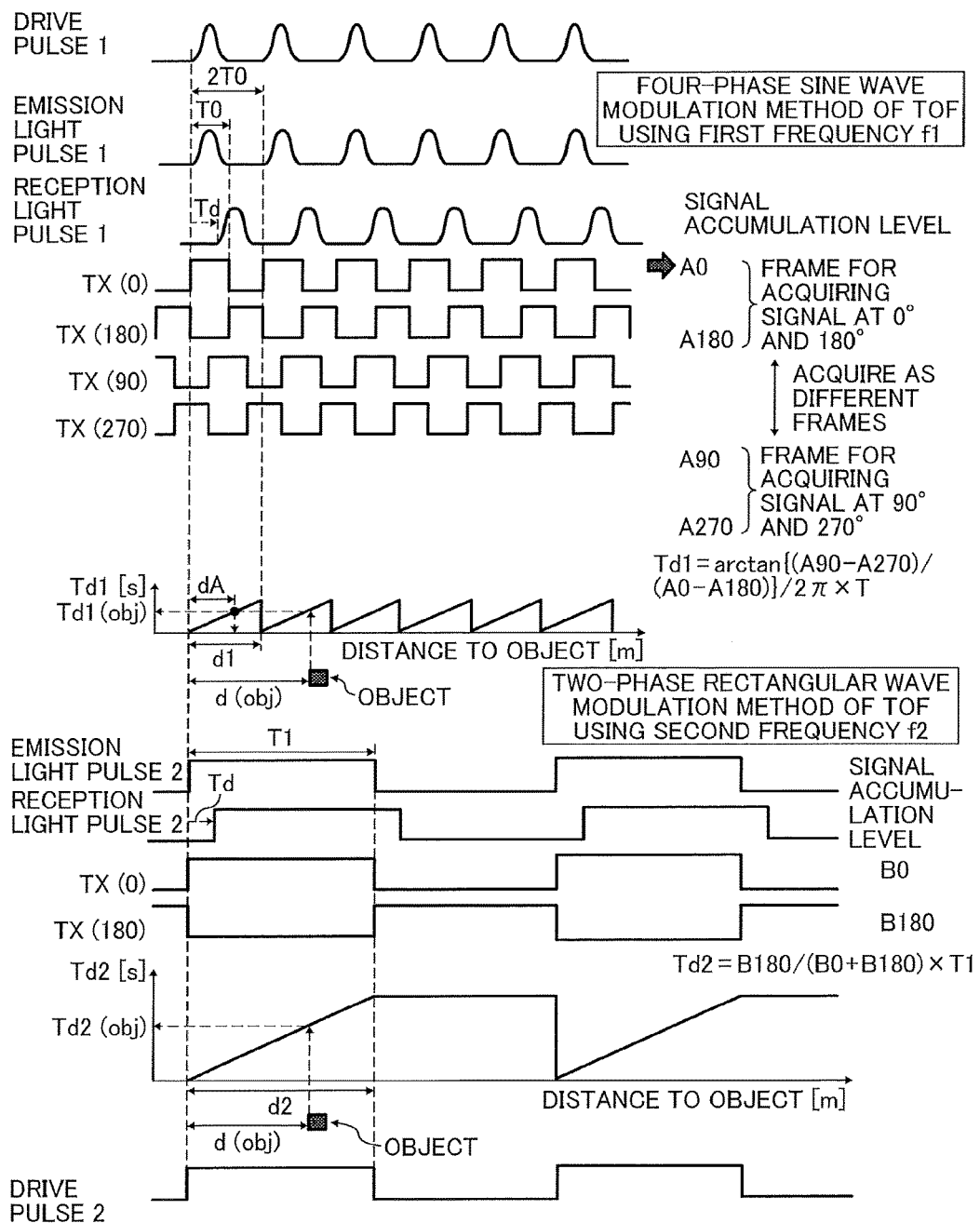
FIG. 15 is a timing chart of a scheme of de-aliasing method of an embodiment.

A description is given of a scheme of the de-aliasing method in an embodiment with reference to FIG. 15. The upper part of the FIG. 15 indicates a phase difference detection operation using a four-phase sine wave modulation method of TOF using the first frequency f1. The lower part of the FIG. 15 indicates a phase difference detection operation using a two-phase rectangular wave modulation method of TOF using the second frequency f2.

Hereinafter, it is assumed that a to-be-measured object exists at a distance d(obj) from the range sensor 20 as indicated in FIG. 15. In this case, the phase difference Td1 (obj) is detected by the phase difference detection operation using the four-phase sine wave modulation method of TOF using the first frequency f1. Since Td1 (obj) includes a delay of one cycle of the first frequency f1 or more, the distance to the object is determined "dA" as indicated in FIG. 15, which is an error value.

Then, the phase difference detection operation using the two-phase rectangular wave modulation method of TOF using the second frequency f2 is performed as indicated in the lower part of FIG. 15, in which the phase difference Td2 (obj) is detected. In this case, since Td2 (obj) does not include a delay of one cycle of the second frequency f2 or more, the distance d(obj) can be detected correctly. Therefore, by combining Td1 (obj) and Td2 (obj), the distance to the object d(obj) can be detected without an error while maintaining the range information having the range resolution using the first frequency f1, which means that the distance to the object is not detected as dA that is an error value.

Since the frequency is set smaller for the TOF detection operation using the second frequency f2, the fluctuation of range finding capability when the second frequency f2 is used becomes greater than the fluctuation of range finding capability when the first frequency f1 is used. However, since the range finding system requires the range resolution for a given distance such as distance d1, the fluctuation of range finding capability when the second frequency f2 is used can be within an allowable level.

Further, the distance d1 and d2 acquirable as the maximum range of TOF method using each of the modulation frequencies indicated in FIG. 15 can be defined as follows, in which "c" is the light speed.

$$d1=2T0 \times c/2$$

$$d2=T1 \times c/2$$

FIG. 15 illustrates an example case when ambient light does not exist. A description is given of a detection method when the ambient light exists with reference to FIG. 16.

Figure 16:
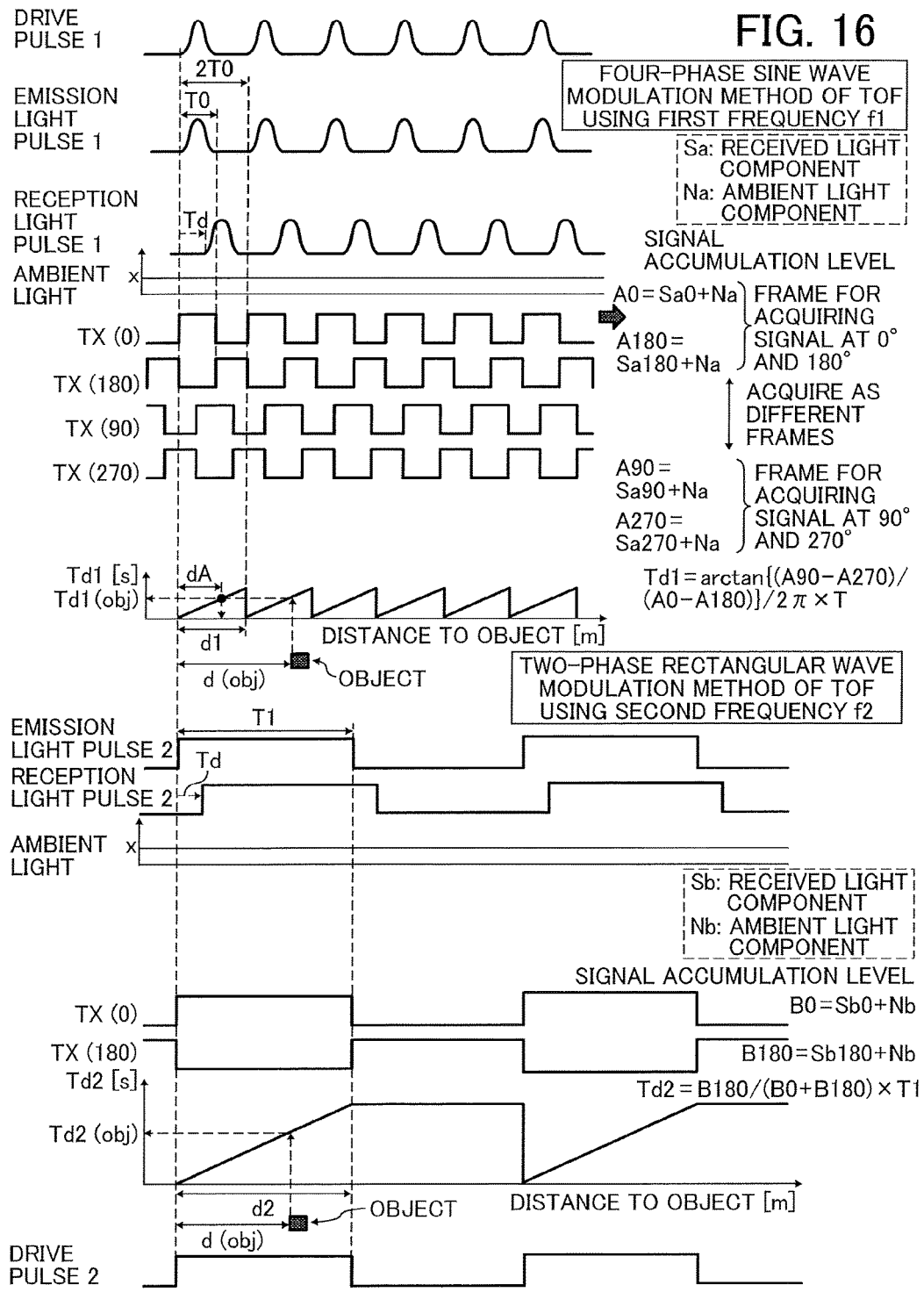
FIG. 16 is a timing chart of another scheme of de-aliasing method of an embodiment when ambient light exists.

As indicated in FIG. 16, when the ambient light exists, the signal accumulation level includes the received light component and the ambient light component.

When the TOF detection operation using the sine wave modulation method using the first frequency f1 is performed, difference of signals can be calculated when computing Td1, in which the ambient light component (Na) can be cancelled automatically during the TOF detection operation as follows.

Numerator in { } of the equation (1): A90−A270=(Sa90+Na)−(Sa270+Na)=Sa90−Sa270

Denominator in { } of the equation (1): A0−A180=(Sa0+Na)−(Sa180+Na)=Sa0−Sa180

By contrast, different from the sine wave modulation method, when the TOF detection operation using the two-phase rectangular wave modulation method using the second frequency f2 is performed, the ambient light component cannot be cancelled automatically during the TOF detection operation as indicated in B180/(B0+B180)=(Sb180+Nb)/(Sb0+Sb180+2Nb).

Therefore, when the two phase pulse modulation method is performed, a method of capturing a light-not-emitted frame and extracting the ambient light component (Nb) can be performed. However, if the frame numbers increases to acquire the ambient light component (Nb) by capturing the light-not-emitted frame, the frame configuration cannot be simplified.

In an embodiment, the ambient light intensity(x) can be determined without increasing the acquired frame numbers. Specifically, the ambient light intensity(x) can be calculated by using a following method. A calibration step is performed under a condition that the ambient light does not enter, in which the first reception light luminance value (Ya0) when the first frequency f1 is used, and the second reception light luminance value (Yb0) when the second frequency f2 is used are measured and stored in the memory. When the first emission light intensity obtained by using the first frequency f1 is set as Pa0, the second emission light intensity obtained by using the second frequency f2 is set as Pb0, and the reflectance of object, distance to the object, and other light loss of the optical system are collectively set as R0, the first reception light luminance value (Ya0) and the second reception light luminance value (Yb0) can be expressed as follows.

$$Ya0=Pa0 \times R0$$

$$Yb0=Pb0 \times R0$$

In the calibration step, a value of Ya0/Yb0=Pa0/Pb0 is stored, in which a ratio of the first emission light intensity obtained using the first frequency f1 and the second emission light intensity obtained using the second frequency f2 is stored in the memory.

A description is given of a process in an actual environmental situation where ambient light exists. At first, based on data acquired by the sine wave modulation method using the first frequency f1, the first reception light luminance value (Ya) can be calculated, for example, by the equation (4).

$$Ya=\sqrt{\{(A0-A180)^2+(A90-A270)^2\}} \qquad (4)$$

As indicated in the equation (4), the ambient light component (Na) is removed automatically from the first reception light luminance value (Ya). Then, based on data acquired by the two-phase rectangular wave modulation method using the second frequency f2, the second reception light luminance value (Yb') when the ambient light exist is calculated by the equation (5), in which the second reception light luminance value (Yb) when the ambient light dose not exist is used. Therefore, the second reception light luminance value (Yb') can be calculated by the equation (5) as below.

$$Yb'=B0+B180=Yb+2Nb \qquad (5)$$

Since a relationship of Ya/Yb=Ya0/Yb0 is set, the equation (5) can be changed to the equation (5-1) to calculate the ambient light component (Nb).

$$2Nb=Yb'-(YaYb0/Ya0) \qquad (5-1).$$

Therefore, by applying this method, the ambient light can be removed when the TOF detection operation is performed using the two-phase rectangular wave modulation method without acquiring a light-not-emitted frame.

Referring back to FIG. 2, when the position controller (monitoring controller) 40 receives three dimensional information from the three dimensional information acquisition unit 203, the position controller (monitoring controller) 40 instructs the display 30 to display the three dimensional information. Further, the position controller (monitoring controller) 40 performs the position control of the vehicle 1 based on the three dimensional information to control a current position of the vehicle 1.

Figure 17:
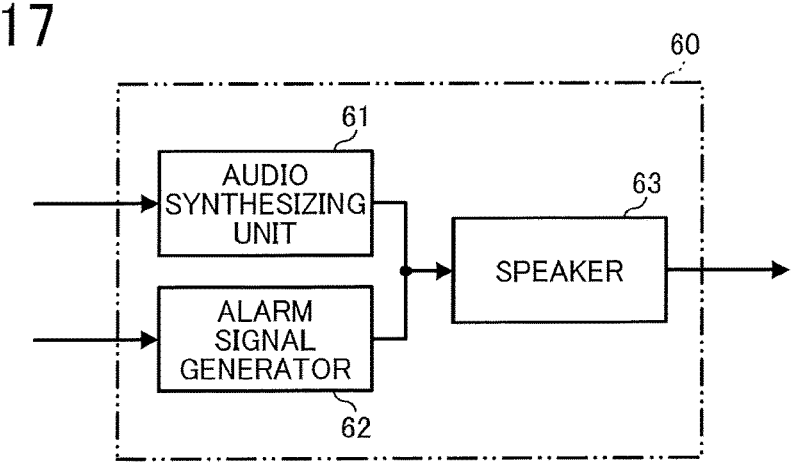
FIG. 17 is a block diagram of an example sound/alarm generator.

As indicated in FIG. 17, the sound/alarm generator 60 includes, for example, an audio synthesizing unit 61, an alarm signal generator 62, and a speaker 63.

Figure 21:
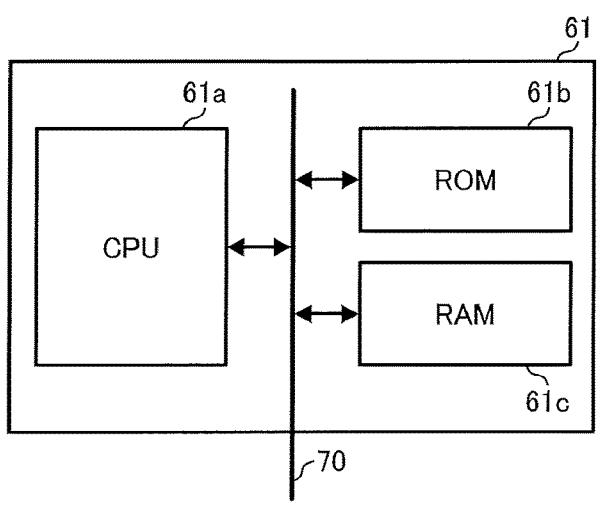
FIG. 21 illustrates an example hardware block diagram of an audio synthesizing unit.

The audio synthesizing unit 61 stores a plurality of audio and/or sound data. When the audio synthesizing unit 61 receives the danger-expecting information from the position controller (monitoring controller) 40, the audio synthesizing unit 61 selects audio data corresponding to the received danger-expecting information, and outputs the corresponding audio data to the speaker 63, and the speaker 63 outputs audio corresponding to the audio data. The audio synthesizing unit 61 can be configured, for example, with a central processing unit (CPU) 61a, a read only memory (ROM) 61b, and a random access memory (RAM) 61c as illustrated in FIG. 21. As to the audio synthesizing unit 61, the ROM 61b stores programs used for executing the above described operations by the audio synthesizing unit 61. The CPU 61a loads the programs to the RAM 61c when executing the above described operations.

Figure 22:
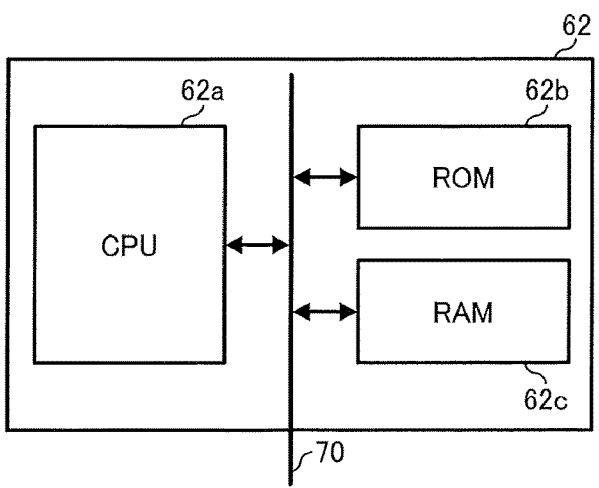
FIG. 22 illustrates an example hardware block diagram of an alarm signal generator.

When the alarm signal generator 62 receives the danger-expecting information from the position controller (monitoring controller) 40, the alarm signal generator 62 generates a corresponding alarm signal, and outputs the alarm signal to the speaker 63, and then the speaker 63 outputs audio corresponding to the alarm signal. The alarm signal generator 62 can be configured, for example, with a central processing unit (CPU) 62a, a read only memory (ROM) 62b, and a random access memory (RAM) 62c as illustrated in FIG. 22. As to the alarm signal generator 62, the ROM 62b stores programs used for executing the above described operations by the alarm signal generator 62. The CPU 62a loads the programs to the RAM 62c when executing the above described operations.

As to the above described embodiment, the range sensor 20 includes the light emission unit 201 including the light source 21 and the light source driver 25, the light detection unit 2202, and the three dimensional information acquisition unit 203 used as the control unit. The light source driver 25 supplies a plurality of drive pulses (e.g., two drive pulses) such as a first drive pulse having a first pulse width, and a second drive pulse having a second pulse width to the light source 21 in different time period, in which the first pulse width and the second pulse width are set with different pulse widths. The light detection unit 202 receives the light emitted from the light emission unit 201 and then reflected from an object. The three dimensional information acquisition unit 203 used as the control unit calculates the distance to the object based on the time difference between one time point when a pulse light is emitted from of the light source 21 and another time point when the light reflected from object is received by the image sensor 29.

In this configuration, one of the first pulse width of the first drive pulse and the second pulse width of second drive pulse is set with a smaller pulse width having a sine wave pattern, and another one of the first pulse width of the first drive pulse and the second pulse width of second drive pulse is set with a greater pulse width having a rectangular wave pattern. In this configuration, the sine wave pattern means the sine waveform and a waveform similar to the sine wave while the rectangular wave pattern means the rectangular wave and a waveform similar to the rectangular wave.

In this case, the drive pulse having the smaller pulse width and having the greater effect of waveform distortion during the rise time and the fall time uses the sine wave pattern while the drive pulse having the greater pulse width and having the smaller effect of waveform distortion during the rise time and the fall time uses the rectangular wave pattern. Therefore, the emission light pulse (pulse light) and the corresponding drive pulse become similar with each other. Therefore, the pulse width of emission light pulse (pulse light) and the pulse width of the corresponding drive pulse also become similar with each other.

Therefore, the error level of the range finding when calculating the range or distance to the object can be reduced based on the delay time of light reception timing of the reception light pulse (reflection light pulse) at the light detection unit 202 with respect to the input timing of each of drive pulses input to the light source 21. With this configuration, the detection precision can be enhanced when any one of the first drive pulse and the second drive pulse are used.

Therefore, both of the higher-resolution range finding, which improves the measurement precision of distance, and the broader range finding which detects broader distance range such as near distance to far distance, can be devised at a higher level.

Further, the light detection unit 202 includes the image sensor 29 such as an image capturing device or image sensing device that receives the light reflected from an object, converts the light reflected from the object to an electrical signal, divides the electrical signal temporally, and allocates divided signals as signals set for a plurality of time periods. Based on the signals, three dimensional information acquisition unit 203 used as the control unit calculates a time difference between one time point when a pulse light is emitted from the light source 21 and another time point when light reflected from object is received by the image sensor 29, calculates a distance to the object based on the calculated time difference, and then acquires three dimensional information of the object. Specifically, the three dimensional information acquisition unit 203 calculates the three dimensional information based on one calculated distance to the object calculated from the above mentioned time difference, obtained during the first time period when the first drive pulse is being supplied to the light source 21, and another calculated distance to the object calculated from the above mentioned time difference, obtained during the second time period when the second drive pulse is being supplied to the light source 21.

With this configuration, the image capturing time can be set with an effective time length and the exposure time can be set with an effective time length, which means the decrease of the image capturing time and the exposure time can be suppressed.

Further, as to the first time period, when the temporal division number of the electrical signal is referred to Na (Na≥3), each of the divided electrical signals is referred to Ci (1≤i≤Na), I=Σ{Ci×sin {(2π/Na)×(i−1))}(1≤i≤Na), Q=Σ{Ci×cos {(2π/Na)×(i−1)}(1≤i≤Na), φ=arctan(I/Q), the pulse width of the first drive pulse is referred to T0, and the time difference is referred to Td, Td=φ/2π×2T0 is established.

With this configuration, the higher-resolution range finding can be devised more effectively.

Further, as to the second time period, when the temporal division number of the electrical signal is referred to Nb (Nb≥2), each of the divided electrical signals is referred to Di (1≤i≤Nb), the time difference is referred to Td', and the pulse width T1 of the second drive pulse is set at both of adjacent electrical signals $D_i$ and $D_{i+1}$ by dividing the pulse width T1 in adjacent electrical signals $D_i$ and $D_{i+1}$, Td'= $D_{i+1}/(D_i+D_{i+1})$×T1 is established.

With this configuration, the broader range finding can be devised more effectively.

Further, as to the image sensor 29, the charges is preferably allocated to "N" portions (e.g., N≥2) per one light reception element.

Further, as to the second time period, the temporal division number of the electrical signal is preferably N or less.

Further, when N=2, the three dimensional information acquisition unit 203 preferably detects the ambient light intensity during the first time period based on luminance information acquired from the image sensor 29, and removes the ambient light component from the luminance information acquired from the image sensor 29 during the second time period.

Further, the time length of a plurality of time periods when a plurality of drive pulses is supplied to the light source 21 can be the same or different.

Further, as to the above described embodiment, the frequencies (modulation frequencies) of the plurality of drive pulses are different, but the frequencies (modulation frequencies) of the plurality of drive pulses can be the same if the pulse widths of the plurality of drive pulses are different.

Since the vehicle 1 includes the above described range sensor 20, the vehicle 1 can move reliably.

Further, as to the above described embodiment, a method of measuring three dimensional information can be performed with a following sequence. Specifically, a first light emission step supplies the first drive pulse having the first pulse width to the light source 21 to emit light, a first light reception step receives the light emitted from the light source 21 (first light emission step) and reflected from an object, a second light emission step supplies the second drive pulse having the second pulse width, different from the first pulse width of the first drive pulse, to the light source 21 to emit light, a second light reception step receives the light, emitted from the light source 21 by supplying the second drive pulse having the second pulse width (second light emission step), and reflected from the object, and a calculating step calculates three dimensional information of the object based on a reception result of the first light reception step and a reception result of the second light reception step.

In this configuration, one of the first pulse width of the first drive pulse and the second pulse width of second drive pulse is set with a smaller pulse width having a sine wave pattern, and another one of the first pulse width of the first drive pulse and the second pulse width of second drive pulse is set with a greater pulse width having a rectangular wave pattern.

In this case, the drive pulse having the smaller pulse width and having the greater effect of waveform distortion during the rise time and the fall time uses the sine wave pattern while the drive pulse having the greater pulse width and having the smaller effect of waveform distortion during the rise time and the fall time uses the rectangular wave pattern. Therefore, the emission light pulse (pulse light) and the corresponding drive pulse become similar with each other. Therefore, the pulse width of emission light pulse (pulse light) and to the pulse width of the corresponding drive pulse also become similar with each other.

Therefore, the error level of the range finding when calculating the range or distance to the object can be reduced based on the delay time of light reception timing of the reception light pulse (reflection light pulse) at the light detection unit 202 with respect to the input timing of each of drive pulses to the light source 21. Therefore, the detection precision can be enhanced when any one of the first drive pulse and the second drive pulse are used.

Therefore, both of the higher-resolution range finding, which improves the measurement precision of distance, and the broader range finding which detects broader distance range such as near distance to far distance, can be devised at a higher level, and further, three dimensional information of an object can be measured with enhanced precision.

As to the above described embodiment, the one frame is divided into a plurality of sub-frames, but not limited thereto. For example, the TOF detection operation using the sine wave modulation method and the higher frequency can be performed for one frame, and the TOF detection operation using the rectangular wave modulation method and the lower frequency can be performed for another one frame.

As to the above described embodiment, three or more drive pulses having different pulse widths can be supplied to the light source during different time periods. In this case, the three or more drive pulses having different pulse widths are categorized as a drive pulse having the greater pulse width and a drive pulse having the smaller pulse width, in which the drive pulse having the smaller pulse width is set with the sine wave pattern while the drive pulse having the greater pulse width is set with the rectangular wave pattern.

Further, as to the above described embodiment, the light emission unit employs a non-scanning system but not limited thereto. For example, the light emission unit can employ a scanning system including an optical deflector (e.g., polygon mirror, galvano mirror, micro electro mechanical systems (MEMS) mirror). In this case, for example, a plurality of light beams emitted from a plurality of light emission elements (line light source) arranged in one direction are deflected to scan the light beams in a direction not parallel to the arrangement direction of the light emission elements such as a direction perpendicular to the arrangement direction of the light emission elements, and a plurality of light reception elements (such as a line image sensor) corresponded to the plurality of light emission elements are configured to receive the light to generate a range image. Further, in another case, the light emitted from a single light emission element is two dimensionally deflected by an optical deflector, and then an area image sensor receives the reflection light from an object to generate a range image.

Further, as to the above described embodiment, a single light emitting diode (LED), which is an example of the light emission element, is used to emit a pulse light, and the area image sensor receives the reflection light from an object, but not limited thereto.

For example, a plurality of light emission elements arranged two dimensionally can be used, in which the plurality of light emission elements emits pulse light sequentially, and a single light reception element sequentially receives each of the emission light pulses (pulse light), emitted from the plurality of light emission elements, and reflected from an object as the reflection light to generate a range image.

Further, for example, when three dimensional information (range image) of an object is not measured but the distance to the object alone is to be measured, one light emission element is set in the light emission unit and one light reception element is set in the light detection unit.

Further, as to the above described embodiment, the position controller (monitoring controller) 40 can perform a part of processing of the three dimensional information acquisition unit 203, and the three dimensional information acquisition unit 203 can perform a part of processing of the position controller (monitoring controller) 40.

Further, as to the above described embodiment, the travel management apparatus 10 includes one range sensor 20 but not limited thereto. For example, the travel management apparatus 10 can include a plurality of range sensors 20 depending on the size of the vehicle 1 and the measurement region.

Further, as to the above described embodiment, the range sensor 20 is used for the travel management apparatus 10 that monitors the forward direction of the vehicle 1, but not limited thereto. For example, the range sensor 20 can be used to monitor the rearward direction and the side direction of the vehicle 1.

Further, as to the above described embodiment, the range sensor 20 is used for the vehicle 1 (i.e., moveable apparatus) but not limited thereto. For example, the range sensor 20 can be used for any moveable apparatus such as airplanes, ships, and boats.

Further, the range sensor 20 can be used for a robot that can move autonomously by checking a position of the robot using the range sensor 20. Further, the range sensor 20 can be used for a three dimensional measurement apparatus that measures a three dimensional shape of an object.

The above described range finding apparatus and the range finding method can be applied to any range finding technologies that uses the Time of Flight (TOF).

The range finding apparatus and the range finding method of the above described embodiment can be used to acquire two and three dimensional information of an object and to detect whether the object exists.

Further, numerical values and shapes used in the above description can be changed within the scope of this disclosure and appended claims.

As to the above described embodiment, both of the higher-resolution range finding, which improves the measurement precision of distance, and the broader range finding which detects broader distance range such as near distance to far distance, can be performed concurrently with a higher level.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A range finding apparatus comprising:
a light emitter including a light source and a light source driver, the light source driver to supply a plurality of drive pulses including a first drive pulse having a first pulse width to the light source at a first time period, and a second drive pulse having a second pulse width to the light source at a second time period, the first pulse width and the second pulse width being different with each other, and the first time period and the second time period being different with each other;
a light detector to receive the light emitted from the light emitter and then reflected from an object; and
circuitry to calculate a range to the object based on a time difference between one time point when a pulse light is emitted from the light source and another time point when light reflected from the object is received by the light detector,
wherein when the first pulse width is set smaller than the second pulse width, the first drive pulse is set with a sine wave pattern and the second drive pulse is set with a rectangular wave pattern, and
when the second pulse width is set smaller than the first pulse width, the first drive pulse is set with a rectangular wave pattern and the second drive pulse is set with a sine wave pattern.

2. The range finding apparatus of claim 1, wherein the light detector includes an image capturing device that receives the light reflected from the object, and converts the light reflected from the object to an electrical signal, divides the electrical signal into a plurality of signals temporally, and allocates each of the plurality of signals to a corresponding time period,
wherein the circuitry calculates a time difference based on the plurality of signals, calculates the range to the object based on the time difference, and acquires three dimensional information of the object based on the calculated range to the object,
wherein the circuitry calculates a first range to the object calculated from the time difference, calculated during the first time period when the first drive pulse is being supplied to the light source, and a second range to the object calculated from the time difference, calculated during the second time period when the second drive pulse is being supplied to the light source to acquire the three dimensional information of the object.

3. The range finding apparatus of claim 2, wherein when a temporal division number of the electrical signal is referred to Na (Na ≥3), each of the divided electrical signals is referred to Ci (1≤i≤Na), $I=\Sigma\{Ci \times \sin\{(2\pi/Na) \times (i-1)\}\}$ (1≤i≤Na), $Q=\Sigma\{Ci \times \cos\{(2\pi/Na) \times (i-1)\}(1 \leq i \leq Na)$, $\varphi=\arctan(I/Q)$, the first pulse width of the first drive pulse is referred to T0, and the time difference is referred to Td for the first time period, $Td=\varphi/2\pi \times 2T0$ is established.

4. The range finding apparatus of claim 2, wherein, in the second time period, when a temporal division number of the electrical signal is referred to Nb (Nb≥2), each of the divided electrical signals is referred to Di (1≤i≤Nb), the time difference is referred to Td', the second pulse width T1 of the second drive pulse is divided into a signal Di and a signal Di+1, which are adjacent electrical signals, $Td'=\{Di+1/(Di+1)\} \times T1$ is established.

5. The range finding apparatus of claim 2, wherein the image capturing device includes one light reception element that receives the light reflected from the object and converts the light into charges, and a plurality of charge accumulators to accumulate the charges, the number of the plurality of charge accumulators is "N" indicating two or more.

6. The range finding apparatus of claim 5, wherein the temporal division number of the electrical signal is "N" or less for the second time period.

7. The range finding apparatus of claim 5, wherein when "N" is two (N=2), the circuitry detects intensity of ambient light based on luminance information acquired from the image capturing device during the first time period, and removes an ambient light component from the luminance information, acquired by the image capturing device, during the second time period.

8. The range finding apparatus of claim 1, wherein the first drive pulse having the first pulse width is supplied to the light source by setting a first time period, the second drive pulse having the second pulse width is supplied to the light source by setting a second time period, and a time length of the first time period and a time length of the second time period are set differently.

9. The range finding apparatus of claim 1, wherein the first drive pulse is set with a first frequency, and the second drive pulse is set with a second frequency different from the first frequency.

10. The range finding apparatus of claim 1, wherein the first drive pulse is set with a first frequency, and the second drive pulse is set with a second frequency that is the same as the first frequency.

11. A moveable apparatus comprising:
the range finding apparatus of claim 1,
wherein the moveable apparatus moves autonomously based on an output result of the range finding apparatus.

12. A robot comprising:
the range finding apparatus of claim 1,
wherein the robot moves autonomously based on an output result of the range finding apparatus.

13. A three dimensional measurement apparatus comprising:
the range finding apparatus of claim 1.

14. A method of measuring three dimensional information of an object, comprising:
supplying a first drive pulse having a first pulse width to a light source to emit a first light from the light source;
receiving the first light, emitted from the light source and reflected from an object, by a light detector;
supplying a second drive pulse having a second pulse width, different from the first pulse width of the first drive pulse, to the light source to emit a second light from the light source;
receiving the second light, emitted from the light source and reflected from the object by the light detector; and
calculating three dimensional information of the object based on a reception result of the first light by the light detector and a reception result of the second light by the light detector,
wherein when the first pulse width is set smaller than the second pulse width, the first drive pulse is set with a sine wave pattern and the second drive pulse is set with a rectangular wave pattern, and when the second pulse width is set smaller than the first pulse width, the first drive pulse is set with a rectangular wave pattern and the second drive pulse is set with a sine wave pattern.

15. A non-transitory storage medium storing a program that, when executed by a computer, causes the computer to execute a method of measuring three dimensional information of an object, the method comprising:
supplying a first drive pulse having a first pulse width to a light source to emit a first light from the light source;
receiving the first light, emitted from the light source and reflected from an object, by a light detector;
supplying a second drive pulse having a second pulse width, different from the first pulse width of the first drive pulse, to the light source to emit a second light from the light source;
receiving the second light, emitted from the light source and reflected from the object by the light detector; and
calculating three dimensional information of the object based on a reception result of the first light by the light detector and a reception result of the second light by the light detector,
wherein when the first pulse width is set smaller than the second pulse width, the first drive pulse is set with a sine wave pattern and the second drive pulse is set with a rectangular wave pattern, and when the second pulse width is set smaller than the first pulse width, the first drive pulse is set with a rectangular wave pattern and the second drive pulse is set with a sine wave pattern.

16. The range finding apparatus according to claim 1, wherein the light source is a light emitting diode.

17. The range finding apparatus according to claim 1, wherein the light source is a semiconductor laser.

18. The range finding apparatus according to claim 17, wherein the semiconductor laser is an edge-emitting laser.

19. The range finding apparatus according to claim 17, wherein the semiconductor laser is a surface-emitting laser.

* * * * *